United States Patent Office 2,963,469
Patented Dec. 6, 1960

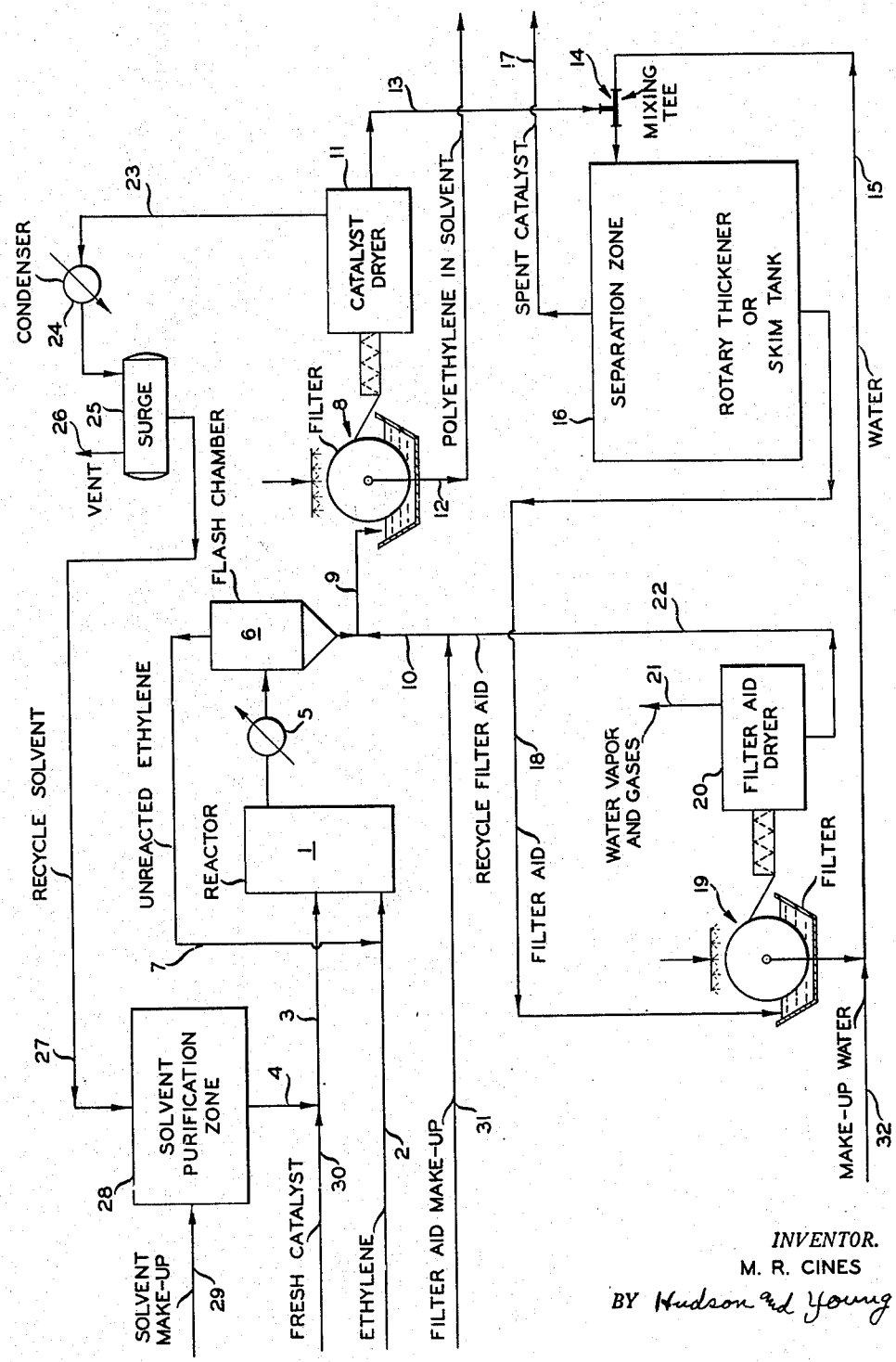

2,963,469

SEPARATION OF CATALYST AND FILTER AID IN OLEFIN POLYMERIZATION

Martin R. Cines, Bartlesville, Okla., assignor to Phillips Petroleum Company, a corporation of Delaware Filed Oct. 16, 1956, Ser. No. 616,206

6 Claims. (Cl. 260—88.2)

This invention relates to an improved method for the separation of solid catalyst and filter aid used in the process of polymerizing olefins to form solid polymers. In one of its aspects this invention relates to a method for the separation of catalyst and filter aid used in an olefin polymerization process so that the filter aid and the catalyst can either or both be regenerated for reuse in the process.

It has recently been discovered that 1-olefins, especially those having a maximum of 8 carbon atoms per molecule and no branching nearer the double bond than the 4-position, can be polymerized to solid and semi-solid polymers at temperatures and pressures which are relatively low as compared with conventional processes for polymerizing such olefins. Such polymerization can be carried out by first admixing and at least partially dissolving the olefins in a non-polymerizable solvent and by carrying out the polymerization in the presence of a catalyst.

In the copending application of Hogan and Banks, Serial No. 573,877, filed March 26, 1956, a process is disclosed for producing polymers of 1-olefins by carrying out the polymerization at a temperature in the range of 100 to 500° F. in the presence of 0.1 to 10 or more weight percent of chromium oxide, preferably including a substantial proportion of hexavalent chromium associated with at least one porous oxide selected from the group consisting of silica, alumina, zirconia and thoria. A preferred catalyst is one comprising 0.1 to 10 or more weight percent chromium as chromium oxide supported upon a silica-alumina base such as 90 percent silica–10 percent alumina. The catalyst employed is usually a highly oxidized catalyst which has been activated by treatment at an elevated temperature under non-reducing conditions and preferably in an oxidizing atmosphere. Polymerization usually is carried out in the liquid phase such as in solution in a hydrocarbon solvent, especially a paraffin or a cycloparaffin which is liquid under the polymerization conditions; however, vapor-phase operation or mixed-phase operation can be effected. Diolefins such as 1,3-butadiene are within the scope of this invention since any olefinic material having olefinic linkage in the 1-position comes within the scope of the invention of the above-identified copending application.

In the process described in the above copending application the catalyst and the filter aid are removed from the filters as an intimate admixture of catalyst and filter aid and neither the catalyst nor the filter aid can be satisfactorily reused without separating the two solids. In my copending application Serial No. 505,174, filed May 2, 1955, now Patent No. 2,849,429, I have disclosed and claimed a method and means for separating these solids by suspending the dried filter cake in a regenerating gas so that the lighter solids and undesirable fines are carried out and separated from the heavier solids. In the practice of the invention of the copending application the filter aid, due to its lower specific gravity and particle size, is more easily carried up by the regeneration gas than is the catalyst and thus a separation is made. The present invention is an improvement over that disclosed in my copending application in that the step of passing the filter aid through the regeneration zone is avoided.

Broadly, the invention contemplates drying the filter cake, comprising an admixture of filter aid and used polymerization catalyst, dispersing the dried filter cake in water so as to form a slurry of filter cake in water and allowing the slurry to stratify so that the catalyst floats upon the surface of the water and the filter aid sinks in the water. The specific gravity of the catalyst and the specific gravity of the filter aid is in each case greater than 1. The specific gravity of diatomaceous earth filter aid is approximately 2.2 and the specific gravity of a chromium oxide-silica-alumina catalyst is approximately 2.4. The specific gravity of the used chromium oxide-silica-alumina catalyst is approximately 1.7, this indicating that the catalyst is probably coated with solid polymer. The floatability of the used catalyst, which has a specific gravity greater than that of water, apparently is due to the inability of the water to wet the polymer-coated catalyst particles.

It is, therefore, an object of this invention to separate used olefin polymerization catalyst from admixture with a filter aid utilizing the inability of water to wet the used polymerization catalyst. It is also an object of this invention to provide a simple and efficient means for the separation of a used olefin polymerization catalyst from admixture with a filter aid. It is a further object of this invention to provide an improved olefin polymerization process wherein the used catalyst and filter aid can be separated and returned for reuse in the process. Other and further objects and advantages of this invention will be apparent to one skilled in this art upon study of the disclosure of this invention including the attached drawing which diagrammatically illustrates one embodiment of the process of this invention.

A better understanding of the invention may be obtained by reference to the attached drawing wherein a specific embodiment of the invention is described in connection with the polymerization of ethylene in a diluent and in the presence of a catalyst. The catalyst is filtered from the polymerization reactor effluent together with a filter aid, the filter cake is dried, slurried with water and the filter aid separated from the catalyst and reused.

Referring now to the drawing, ethylene is admitted to reactor 1 via conduit 2 and a slurry of chromium oxide on silica-alumina catalyst in cyclohexane is admitted via conduit 3. Cyclohexane solvent is added to the catalyst from line 4 to form the slurry. The reactor is maintained at a pressure of about 450 p.s.i. and a temperature of about 285° F. The reactor effluent comprising ethylene, solvent, catalyst and polymer passes from reactor 1 to heater 5 where the temperature is raised to about 325° F., and then to flash chamber 6 where the pressure is dropped to 100 p.s.i. and most of the ethylene is removed via conduit 7 and returned to reactor 1. The polymer concentration in the reactor is about 3.5 weight percent and the catalyst concentration is about 0.2 weight percent. The mixture of polymer, catalyst and solvent, at about 300° F., passes to rotary filter 8 via conduit 9. Filter aid, such as diatomaceous earth, is added to the slurry in conduit 9 via conduit 10 at the rate of 2 pounds of filter aid per pound of catalyst. The filter cake is washed with cyclohexane solvent and the filtrate is removed via conduit 12 and passed to a polymer recovery step (not shown). The wet filter cake, after being suitably washed with cyclohexane or other solvent, passes from filter 8 to rotary dryer 11. The pressure in the dryer is about atmospheric and the temperature is maintained at about 300° F. Solvent is removed from the dryer via conduit 23, through cooler 24 to surge tank 25. Non-condensible gases are vented through conduit 26. Liquid solvent passes via conduit 27 to purification zone 28.

The dried filter cake, reduced to particulate form in dryer 11, passes via conduit 13 to mixing T 14, where a slurry is formed with water introduced via conduit 15. The slurry produced in mixing T 14 passes to a separation means 16, such as a skim tank. Floating catalyst is removed via conduit 17 and can be regenerated or discarded, as desired. Filter aid is removed from the bottom of the separator as a slurry in water and passes via conduit 18 to filter 19. The wet filter cake from filter 19 passes through rotary dryer 20, the vapors from dryer 20 are vented via conduit 21, and the dry filter aid is returned to the process via conduit 22.

Fresh or makeup solvent is introduced to the system via conduit 29; fresh catalyst is introduced via conduit 30; filter aid is introduced via conduit 31; and water is introduced via conduit 32.

The following example will illustrate the invention but is not to be construed as limiting the invention.

EXAMPLE

The reactor effluent from the continuous catalytic polymerization of ethylene in cyclohexane in the presence of a chromium oxide on silica-alumina catalyst, as described with reference to the drawing, was mixed with a diatomaceous earth filter aid, designated as Celite 545, in the ratio of 1 pound of filter aid per 50 gallons of reactor effluent liquid, and was charged to a Vallez filter. The polymer concentration of the reactor effluent was about 3.4 weight percent and the catalyst concentration was about 0.2 weight percent.

At the completion of the filtration cycle, the filter cake was flushed with cyclohexane and washed from the leaves of the filter into a stripping vessel where cyclohexane was removed by steam distillation. A sample of the wet filter cake was broken up and introduced into a vessel of water with stirring. Practically all of the filter cake settled.

Another sample of the filter cake was air dried at about 300° F., broken up and introduced into a vessel of water with stirring. Initially all of the cake floated, however, after vigorous stirring, the slurry was allowed to stand and a separation of floating and non-floating particles occurred.

It was determined that 31 parts by weight of the filter cake floated and 69 parts by weight settled. Additional agitation failed to cause any more of the filter cake to settle. The amount of catalyst in the floating and non-floating fractions was determined by analysis for chromium because the catalyst contained about 2.5 weight percent chromium and the filter aid was substantially chromium-free. The amount of polymer was determined by removing the polymer by oxidation.

The results of the analysis are reported in the following tables:

Table I

| Sample | Polymer, Wt. percent | Catalyst, Wt. percent | Filter Aid, Wt. percent |
|---|---|---|---|
| Total filter cake | 16.6 | 12.7 | 70.7 |
| Floating filter cake | 35.4 | 26.4 | 38.2 |
| Non-floating filter cake | 7.5 | 7.4 | 85.1 |

Table II

| | Material Balance | | Catalyst | Filter Aid |
|---|---|---|---|---|
| | Total Cake | Polymer | | |
| Floating cake | 31 | 68.2 | 61.6 | 16.8 |
| Non-floating cake | 69 | 31.9 | 38.5 | 83.4 |

In the above description, the polymerization of ethylene is described. However, the invention is applicable to other olefins such as 1-olefins having a maximum chain length of 8 carbon atoms and no branching nearer the double bond than the 4-position as described above. Mixtures of these olefins can also be used. For example, ethylene-propylene copolymer is frequently prepared as disclosed in copending application Serial No. 573,877.

In the above description, the polymerization reaction has been described using the preferred chromium oxide-silica-alumina catalyst, but it should be understood that this invention is applicable to other catalysts which are useful in the polymerization, especially those described in the above-referred-to copending application. Similarly, cyclohexane has been employed in the description of the invention, however, other solvents which have been disclosed in copending application Serial No. 573,877 such as paraffinic and cycloparaffinic hydrocarbons having 3 to 12 and, preferably, 5 to 12 carbon atoms per molecule including propane, isobutane, normal butane, pentanes, including cyclopentane, hexanes, heptanes, octanes, and the like, can be utilized in this invention.

The polymerization reaction can be carried out at a temperature in the range of 100–450° F. with a preferred temperature for the polymerization of ethylene in the range of 275–375° F. and for propylene and higher molecular weight 1-olefins a temperature in the range of 150–250° F. is preferred. The pressure used is generally sufficient to maintain the solvent in the liquid phase and a pressure in the range of 100–700 p.s.i.g. is generally used with a pressure in the range of 450–550 p.s.i.g. being most frequently used.

The rotary filter indicated in the drawing has the advantage of having the cake continuously removed, however, other filter devices (or a centrifuge or settler) can be employed. In any case, the filter cake is treated as described.

There are many known filter aids which can be employed in the practice of this invention. However, an inorganic filter aid having a specific gravity greater than 1 is generally preferred. The filter aid required for satisfactory removal of catalyst from polymer solution will generally be in the range of 0.5 to 6 weight part filter aid to 1 part catalyst and more generally in the range of 1–4 parts per part. The catalyst cake can be broken up by a pulverizer before being slurried with the water if desired, however, in a rotary dryer, sufficient breakdown of the cake is generally obtained.

The catalyst and filter aid separation process of this invention also is applicable to other polymerization processes, such as the polymerization of 1-olefins over other solid catalysts which are active for the polymerization of 1-olefins to solid or semi-solid polymers.

Separation means for separating the floating catalyst from the non-floating filter aid include rotary thickeners, wherein the slurry is introduced intermediate the top and bottom, the floating material overflows and the non-floating material is removed from the bottom; skim tanks, which are sedimentation vessels providing a quiescent zone for stratification of floating and non-floating materials; and other separation means. Suitable separation devices, such as the Dorr classifier, are described in the section on mechanical separations in "Chemical Engineers Handbook" by J. H. Perry, third edition.

The invention is not limited to the use of pure water because aqueous solutions can be employed for the separation step. The specific gravity of any aqueous solution utilized should be below that of either component to be separated.

Reasonable variations and modifications are possible within the scope of the disclosure of the invention, the essence of which is the discovery that the catalyst employed in the polymerization of olefins can be separated from the filter aid in the filter cake by drying the filter cake and slurrying it in water whereby the catalyst is floatable in water, whereas the filter aid is not floatable.

That which is claimed is:

1. A process for polymerizing a 1-olefin having a maximum chain length of 8 carbon atoms and having no branching closer than the 4-position to the double bond, said process comprising dissolving said olefin in a saturated hydrocarbon solvent; adding an activated chromium oxide on silica-alumina catalyst to said solution; stirring the resulting solution under a pressure in the range of 100–700 pounds per square inch gage and at a temperature in the range of 100–450° F. until the desired degree of conversion is obtained; flashing unreacted olefin from the resulting slurry; adding diatomaceous earth filter aid at the rate of 0.5 to 6 weight parts filter aid per part catalyst to the remaining slurry; removing catalyst and filter aid from polymer solution; removing an admixture of catalyst and filter aid; washing the admixture of catalyst and filter aid substantially free of polymer with additional solvent; drying the washed admixture of catalyst and filter aid at a temperature of about 300° F.; dispersing the admixture in water so as to form a slurry; stratifying said slurry into a floating solid catalyst phase and a sinking solid filter aid phase; removing floating catalyst from said slurry; recovering filter aid which sinks in said slurry; and drying said filter aid for reuse.

2. The process of claim 1 wherein the 1-olefin is ethylene.

3. The process of claim 1 wherein the 1-olefin is propylene.

4. The process of claim 1 wherein the 1-olefin is a mixture of ethylene and propylene.

5. In a process for polymerizing a 1-olefin having a maximum of 8 carbon atoms per molecule and having no branching nearer the double bond than the 4-position which comprises contacting said olefin with a catalyst comprising chromium oxide associated with at least one porous oxide selected from the group consisting of silica, alumina, zirconia, and thoria suspended in a saturated hydrocarbon solvent to form a normally solid polymer, adding diatomaceous earth filter aid to a resulting slurry of catalyst in solvent containing dissolved polymer, filtering the slurry, and drying the resulting filter cake, the improvement which comprises dispersing the dried filter cake in water; allowing the resulting slurry of filter cake and water to segregate into a floating catalyst phase and a filter aid phase which sinks in the water; removing floating catalyst; and removing and recovering filter aid which sinks in the water.

6. In a process for polymerizing a 1-olefin having a maximum of 8 carbon atoms per molecule and having no branching nearer the double bond than the 4-position which comprises contacting said olefin with a catalyst comprising chromium oxide associated with at least one porous oxide selected from the group consisting of silica, alumina, zirconia, and thoria suspended in a saturated hydrocarbon solvent to form a normally solid polymer, adding an inorganic filter aid having a specific gravity greater than 1 to a resulting slurry of catalyst in solvent containing dissolved polymer, filtering the slurry, and drying the resulting filter cake at a temperature sufficient to remove adhering liquid therefrom, the improvement which comprises dispersing the filter cake freed of adhering liquid in water; allowing the resulting slurry of filter cake and water to segregate into a floating catalyst phase and a filter aid phase which sinks in the water; removing floating catalyst; and removing and recovering filter aid which sinks in the water.

References Cited in the file of this patent

UNITED STATES PATENTS

| | | |
|---|---|---|
| 2,555,255 | Suhanin | May 29, 1951 |
| 2,565,960 | Garber et al. | Aug. 28, 1951 |
| 2,606,660 | Klepetko et al. | Aug. 12, 1952 |
| 2,692,261 | Peters et al. | Oct. 19, 1954 |
| 2,825,721 | Hogan et al. | Mar. 4, 1958 |
| 2,849,429 | Cines | Aug. 26, 1958 |

OTHER REFERENCES

Perry: Chemical Engineers Handbook, pages 922–925, 941–947, McGraw-Hill, 1950.

Badger et al.: "Elements of Chemical Engineering," second edition, pages 579–586 (1936).